Aug. 20, 1957 G. N. DE COWSKY ET AL 2,803,602
CATHODIC PROTECTION SYSTEM
Filed July 14, 1954 2 Sheets-Sheet 1
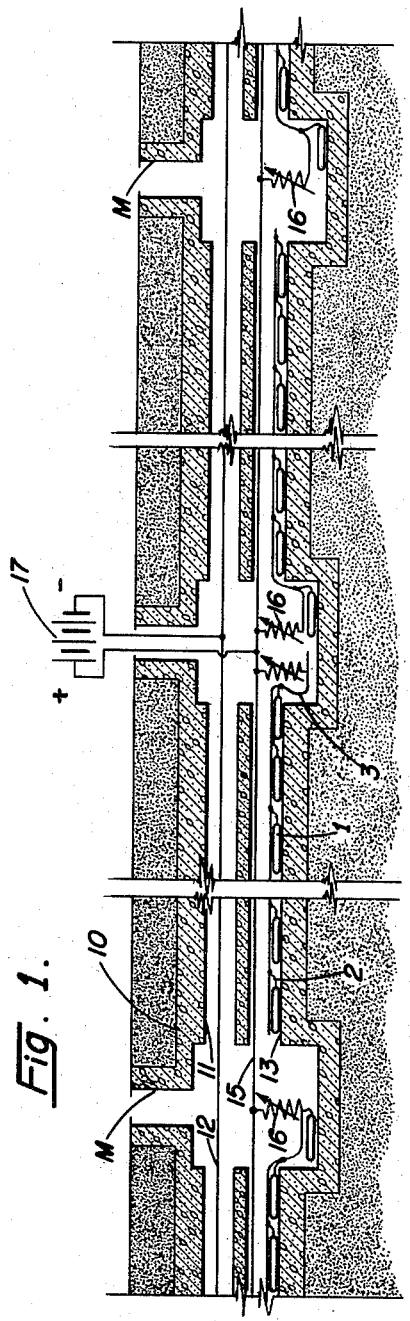
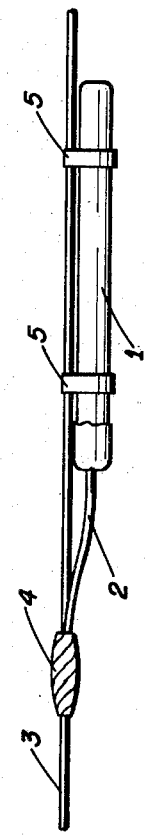
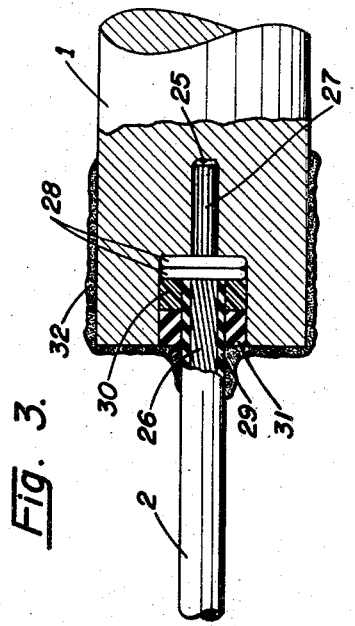
INVENTORS
GEORGE N. De COWSKY
ROBERT C. De MARCO
JOHN E. JOHNSON
BY
ATTORNEY

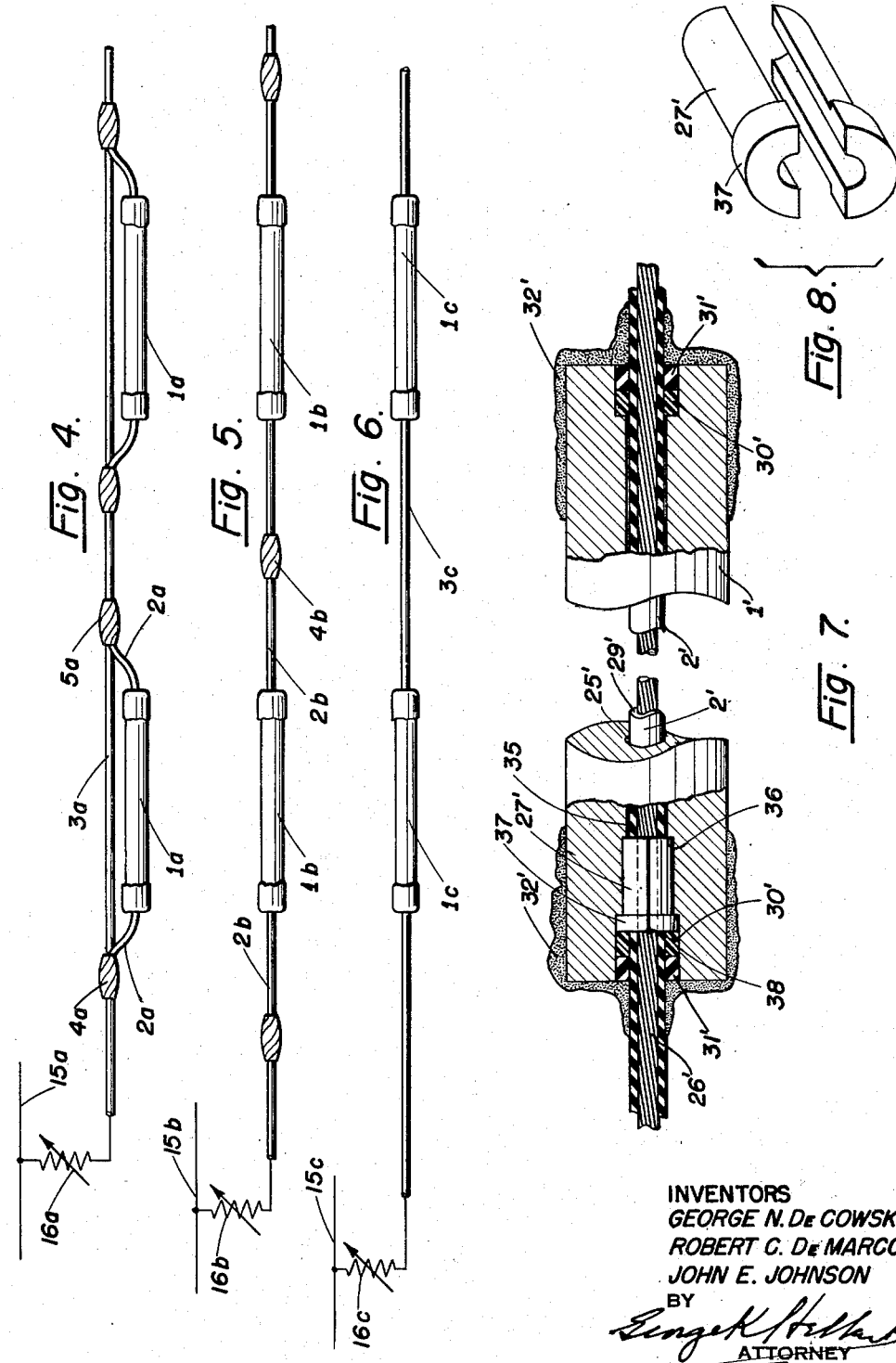

United States Patent Office 2,803,602
Patented Aug. 20, 1957

2,803,602

CATHODIC PROTECTION SYSTEM

George N. De Cowsky, Springfield, Robert C. De Marco, Clifton Heights, and John E. Johnson, Havertown, Pa.

Application July 14, 1954, Serial No. 443,236

1 Claim. (Cl. 204—196)

The present invention relates to protection of metal sheathed underground cables and the like from corrosion.

It is generally known that currents such as the ground return of a positive potential power source as from an electric railway line seek metallic structures extending in the ground in directons generally paralleling the shortest electrical path through the earth to the negative pole of such source. Metallic cable sheaths are typical of such structures, which thus may become more positive in potential than the surrounding soil and release current to the ground causing dissolution of the metal at the area at which the current leaves the sheath and ultimate service failure of the latter.

Numerous procedures have been proposed for minimizing corrosion of this character, as by application of an external source of D. C. voltage to the underground structure to be protected whereby the latter becomes and is maintained lower in potential than the surrounding usually moist media and thus is made a cathode instead of an anode, it being recognized that usual forms of corrosion are substantially prevented when the cathodic protection makes the element sufficiently negative to the surrounding medium. The procedures suggested have been directed to maintaining the structures to be protected uniformly at this potential throughout their length, for example, by use of deposits of scrap metal buried at points in the ground spaced some distance away from the structure with the positive lead of a direct current source connected to each such deposit and the negative lead connected to the structure. But since it is impractical to provide such deposits at intervals spaced closely enough the potential of the structure relative to the soil cannot be kept uniform throughout its length in this way and it may even become positive and hence anodic with relation to the surrounding soil for distances intermediate adjacent negative connections with resultant excessive electrolytic corrosion at such areas. Also there has been used an uninsulated flexible metallic rod or ribbon anode such as magnesium paralleling a metal-sheath cable and extending in a duct adjacent thereto with a source of D. C. potential connected at its negative pole to the cable sheath and at the positive pole to the anode. Under these circumstances, however, the anode, being anodic with respect to the ground, is subjected to relatively rapid electrolytic corrosion, usually non-uniform, and when it parts as a result adjacent the connection with it of the D. C. source a considerable length of cable sheath beyond the break may be deprived of cathodic protection for a long time before the fault in the ribbon is discovered, with resultant excessive corrosion of the sheath.

It is therefore a principal object of our invention to provide novel means for supplying cathodic protection to underground structures, primarily metal cable sheaths and the like, whereby there may be readily maintained on the sheath a voltage negative to the surrounding media and substantially uniform throughout the considerable length thereof which can be protected by our cathodic protection system.

A further object is to provide a novel sectionalized sacrificial anode readily disposable in a subterranean duct or the like to maintain a suitable negative potential relative to surrounding media on adjacent cable sheaths to thereby prolong the useful life thereof through substantial elimination of corrosion.

A still further object is to provide apparatus affording a plurality of low resistance paths for low voltage current from a D. C. source having its negative lead connected to the cable sheath to be protected through electrical communication of its positive lead with a series of corrosion-resistant sacrificial anodes substantially incapable of severe deterioration under electrolytic action and therefore of character not requiring replacement over periods of many years.

Further objects, purposes and advantages of the invention will hereafter more fully appear or be understood from the following description of certain embodiments of it illustrated in the accompanying drawings in which:

Fig. 1 is a partially diagrammatic fragmentary representation of the arrangement of our cathodic protection system in association with a subterranean power transmission line including a metal-sheathed cable, distances between adjacent manholes of the duct system in which it is disposed being foreshortened to conserve space;

Fig. 2 on a much larger scale is a side elevation of a typical sacrificial anode utilized in the system and attached to a header wire in accordance with the invention;

Fig. 3 is a further enlarged fragmentary detail of the anode partly in axial section showing the connection of a low resistance metal conductor therewith;

Fig. 4 is a partly diagrammatic fragmentary side elevation corresponding somewhat to Fig. 2 but on a smaller scale and showing a modified embodiment of the invention in which anode rods having axial bores from end to end are employed;

Fig. 5 is a similar view of another embodiment utilizing such rods;

Fig. 6 is a generally like view of still a fourth embodiment utilizing the same kind of rods;

Fig. 7 is an enlarged fragmentary detail largely in axial section and generally corresponding to Fig. 3 showing the manner of making connection between a low resistance conductor and an anode rod of the character shown in Figs. 4–6 inclusive and Fig. 8 is an enlarged and exploded view in perspective of a ferrule employed in the connection shown in Fig. 7.

Referring now more particularly to the drawings the cathodic protection apparatus therein illustrated in Figs. 1–3 inclusive includes a plurality of anode rods 1 each connected by an insulated low resistance conductor or pigtail 2 to a common insulated low resistance conductor or header wire 3. The rods 1 preferably are made of compacted and bonded carbon particles, graphite, or other relatively acid- and corrosion-resistant material and have low resistance electrical contact with pigtails 2, each of the latter being insulated on its surface from the point at which it leaves the rod to its connection with header wire 3 where, preferably by a served and soldered splice throughly protected against current leakage by insulating tape 4, a good electrical connection with the header wire is maintained. For convenience in handling and in installing the system in existing underground ducts rods 1 are attached individually to the header wire 3 as by several turns of any suitable pressure-adhesive tape 5 disposed near the ends of each rod, the rods normally being spaced along the header approximately on 5' centers when, as usual, rods 2" in diameter and 18" long are employed. A length of insulated header wire with a series of anodic rods applied to it as just described sufficient to substantially span the distance between each pair of adjacent manholes M is provided, the manholes in accordance with usual practice being spaced at intervals of several hundred feet along the cable duct bank 10, one duct 11 of which contains a sheathed cable 12 to be protected. An otherwise unoccupied duct 13 paralleling the duct 11 through which the cable extends is conveniently used to house the header wire and its anodes, as well as a continuous insulated feeder wire 15 which may be connected to a succession of similar header wires at each of several manholes. Each header wire thus provides electrical communication with a series of longitudinally spaced anodes in duct 13 between each two adjacent manholes and the several header wires in turn are connected at the manholes, preferably through a variable resistor 16, to the feeder wire. When a single continuous feeder wire is employed it is connected at suitable intervals to the positive terminal of a D. C. supply conventionally represented in Fig. 1 by battery 17, the negative terminal of which runs to the metallic sheath of cable 12 to be protected, and each of the several resistors 16 when appropriately adjusted maintains the positive potential of the group of anodic rods connected with it through the adjacent header wire 3 at the proper value in view of local conditions to minimize electrolytic corrosion of that part of the cable sheath in the vicinity of the group.

There is illustrated in Fig. 3 in detail one convenient and highly satisfactory arrangement for providing low resistance connection between the metal conductor of a pigtail and the carbon of an anode without exposing the former to anodic electrolysis even when the entire assembly is submerged in water. This connection is made by forming in the end of the carbon or graphite anode rod 1 a counterbored axial hole 25, applying to the end of the stranded metal conductor 26 of the pigtail 2 a knurled copper ferrule 27, which should be soldered to the conductor, and seating it snugly in hole 25; a pair of copper driving washers 28 closely fitting the ferrule and the counterbore are positioned at the end of insulation 29 on the pigtail and at assembly are driven home to firmly secure the conductor in the rod. Waterproof sealing compound 30 in a relatively plastic state is then tamped in place by forcing into the counterbore an annular rubber gasket 31 slidably positioned on the pigtail before entry of its end into the rod. Thereafter the end portion of the anode and the adjacent part of insulation 29 are thickly coated with a suitable electrically insulating moisture impermeable adhesive 32 which wholly excludes moisture from access to the contact areas between the metallic conductor and the carbon anode. For best results it is usually advisable to use for the pigtails, as well as for all other low resistance conductors, stranded copper wire as shown.

In the modified arrangements shown in Figs. 4–6 inclusive the rods 1a, 1b, 1c have axial bores from end to end and the conductors through which the current passes extend in these bores and beyond both ends of the rods. In Fig. 4 the exposed portions of the conductors beyond the ends of the rods 1a form pigtails 2a which have their respective extremities secured to the insulated header wire 3a. If preferred both pigtails may be electrically spliced to the header wire but usually it is sufficient to splice but one to it as at 4a and merely wrap the other about the insulation and secure it thereto with tape 5a whereby the pigtail serves as means for physically holding the rod aligned with the header wire in lieu of the tape 5 used in Fig. 2. The header wire 3a, as in the embodiment of the invention first described, is connected through a resistor 16a to a feeder wire 15a and the latter is supplied with positive potential from a suitable source (not shown).

In Fig. 5 anode rods 1b are assembled with pigtail conductors 2b similarly to the rods just described but the pigtails are spliced together end to end at splices 4b whereby the succession of pigtail conductors becomes as well the header wire, the end one in each group or series being connected through resistor 16b to a feeder wire 15b.

A comparable arrangement is illustrated in Fig. 6 in which rods 1c are strung on a continuous header wire 3c, the latter taking the place of pigtails as well as supplying current delivered by feeder wire 15c through resistor 16c. Thus the arrangements in Figs. 5 and 6 are identical electrically, the differences being solely in mode of construction or assembly and if desired both may be used in a single group.

The conductors, whether an individual pigtail for each anode rod (Figs. 4 and 5) or a wire of considerable length carrying a number of rods, are conveniently assembled with the rods as illustrated in Fig. 7, rod 1' therein having an axial hole 25' from end to end preferably counterbored at its extremities. Between the counterbores the hole is of sufficient diameter to pass with a small clearance 35 the insulated conductor 2' from which a short section of the insulation 29' is removed for making contact between the preferably stranded wire 26' and the rod as hereafter more fully described.

A split ferrule 27', the internal diameter of which corresponds to the diameter of wire 26' is used for making the contact, being fitted to the wire in the zone which has been bared and preferably soldered thereto. The ferrule is then driven into one counterbored end of the anode rod with which it is proportioned to fit snugly and to bottom on a shoulder 36 in the counterbore as its outer flange 37 seats on another shoulder 38 spaced therefrom. When the ferrule has been properly seated plastic sealing material 30' is deposited in the counterbores at both ends of the rod and secured by elastic annular gaskets 31' which of course first have to be strung on the conductor 2'. Insulating adhesive 32' applied over the ends of the rod and adjacent portions of the conductor completes the sealing of the assembly and protects the metal parts from moisture and corrosive attack.

It will be noted that the construction positively inhibits movement of the conductor in the anode rod through seating of the ferrule 27' and its flange 37 on shoulders in the rod counterbore when the anode is drawn through a duct in the direction tending to seat the ferrule more firmly against the shoulders, i. e. toward the right in Fig. 7.

It will be noted further that the provision of a conductor extending outwardly from both ends of the anode rod, whether utilized as in Fig. 4, Fig. 5 or Fig. 6, enables taping of the rod itself to a conductor, as by tape 5 in Fig. 2, to be omitted thus eliminating an operation involving some expense and exposing a larger area of the bare surface of the anode rod for passage of current to surrounding media.

While our apparatus may be installed at the same time a cable is being laid and in the same duct or trench it is sometimes impossible to predict just where cathodic protection will be required by the cable since in some localities stray earth currents are insufficient to make it necessary. For this reason it is contemplated the apparatus will usually be installed in a duct paralleling one or more containing existing cables after conditions have indicated the desirability of providing cathodic protection for the cable sheathing. To this end a tension element is first passed through an unoccupied duct in the duct bank from one manhole to an adjacent one and one end of the element is attached to an end of a feeder wire, to which is secured a header wire carrying sufficient anodes to afford protection to the intervening cable length. Then the tension element is drawn from one manhole while the anode assembly, including the feeder and header wires, is fed into the duct from reels or the like mounted adjacent the other manhole until it extends for the length of the duct, manual assistance usually being provided to guide the anodes and wires into the duct end to insure against damage to any of the equipment. The resistors are appropriately connected between the feeder wire and the header wires as the work proceeds along the series of manholes, the feeder wires usually being spliced at each to provide a continuous conductor of length at least corresponding to the length of cable sheath to be protected. The resistors are then adjusted to control the voltage supplied by the D. C. source 17 through the feeder wire to the respective header wires.

Thereafter the apparatus requires little or no attention even in instances in which the anodes extend in ducts submerged in water since the voltage carried by the system is insufficient to place any appreciable electrical strain on the insulation covering the low resistance conductors including pigtail, header and feeder wires, while the carbon or graphite anodes connected therewith and having exposed surfaces from which a current flows are substantially unsusceptible of attack by either chemical or electrolytic action.

Based on actual use of the invention in protecting lead sheathed cables, supplemented by laboratory tests and scientific knowledge of the properties of the materials employed, it is estimated the apparatus has an efficient operating life of from 25 to 30 years, but of course at any time should doubt arise as to its proper functioning any string of anodes may be pulled from its enclosing duct for inspection and, if necessary, repair, or replacement of anode rods. A further advantage of our invention resides in its ability to afford reasonably adequate protection to that portion of the cable sheath adjacent any anode which for some reason such as damage to the anode itself while being drawn into the duct during installation might become inadequately electrically connected to the current source, since the currents flowing from the adjacent anodes are distributed in part over the aforesaid portion of the cable. Consequently the possibility of total failure of the apparatus in performance of its intended function is negatived whereas when metallic ribbons or the like are utilized as anodes any serious deterioration or a break therein especially adjacent its connection to the D. C. source may largely or completely render the ribbon unable to supply the protective current, in which condition it may remain a long time before the failure is detected.

It has been estimated that a current of one ampere flowing continuously for a year may dissolve as much as 75 lbs. of lead at the location where the current leaves the metal and currents of this order of magnitude are not unusual as stray currents in the ground, particularly in municipalities having extensive electric street railway systems. Consequently lead cable sheaths may be subject to severe deterioration from this cause which is entirely eliminated with the aid of our apparatus whereby the electrolytic action is directed against the relatively inert carbon or graphite sacrificial anodes instead of the cable sheath.

Although we have illustrated and described our invention using sacrificial anode elements of carbon, graphite, or the like it is to be understood that it is equally feasible to use elements of other electrically conductive materials, metallic or non-metallic, moreover while we have particularly referred to the use of our invention in protecting lead sheathed cables, it may be employed with equally successful results in protecting pipes and other metallic underground structures, and we therefore do not desire or intend to be limited or confined in any way by such description as changes and modifications in the form, structure and arrangement of the several parts of the apparatus and in the specific manner of its use, other than as herein mentioned, will readily occur to those skilled in the art and may be adopted if desired without departing from the spirit and scope of the invention as defined in the appended claim.

Having thus described our invention, we claim and desire to protect by Letters Patent of the United States:

In combination, an elongated metallic structure disposed in one duct of a group of generally paralleling ducts buried in the earth, a plurality of longitudinally spaced-apart electrically conducting members of relatively acid- and corrosion-resistant material drawn into another duct of said group and distributed substantially throughout the length of the structure to be protected, said members being suitably sized in relation to the surrounding duct to permit free longitudinal movement of said members while being drawn into said other duct, an insulated low-resistance electrical conductor drawn into the duct with said members, each of said members making electrical connection with said conductor and being attached thereto whereby said members are conveniently drawn into the duct with said conductor, and a source of unidirectional current having its negative terminal in electrical connection with said structure and its positive terminal in electrical connection with said electrical conductor.

References Cited in the file of this patent

UNITED STATES PATENTS

| | | |
|---|---|---|
| 1,489,743 | Delius et al. | Apr. 8, 1924 |
| 1,664,800 | Mills | Apr. 3, 1928 |
| 1,962,696 | Rhodes | June 12, 1934 |